(12) United States Patent
Heinz et al.

(10) Patent No.: US 6,474,216 B2
(45) Date of Patent: Nov. 5, 2002

(54) PROTECTIVE TUBE FOR A PISTON-CYLINDER ASSEMBLY

(75) Inventors: Norbert Heinz, Üchtelhausen; Thomas Eichenmüller, Gochsheim; Karlheinz Hofmann, Werneck, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/790,789

(22) Filed: Feb. 22, 2001

(65) Prior Publication Data

US 2001/0018863 A1 Sep. 6, 2001

(30) Foreign Application Priority Data

Feb. 22, 2000 (DE) .......................................... 100 08 140

(51) Int. Cl.[7] .................................................. F01B 7/20
(52) U.S. Cl. ........................................ 92/51; 92/169.1
(58) Field of Search .......................... 92/51, 161, 169.1

(56) References Cited

U.S. PATENT DOCUMENTS 4,003,454 A * 1/1977 Wossner ................. 188/322.22
4,397,452 A * 8/1983 Fouts ........................... 188/284
4,828,232 A * 5/1989 Harrod et al. ............. 267/64.24
5,121,906 A * 6/1992 Seit .............................. 267/221
5,368,141 A * 11/1994 Clarke ....................... 188/282.8

FOREIGN PATENT DOCUMENTS

| DE | 1951753 | 7/1966 |
| DE | 1951754 | 12/1966 |
| DE | 1995281 | 10/1968 |

* cited by examiner

Primary Examiner—Edward K. Look
Assistant Examiner—Igor Kershteyn
(74) Attorney, Agent, or Firm—Cohen, Pontani, Lieberman & Pavane

(57) ABSTRACT

Protective tube for a piston-cylinder assembly of the type including a piston rod located with freedom of axial movement in a cylinder, the rod also having a section which extends outside the cylinder. A retaining element for the protective tube is attached to the piston rod, which retaining element includes a multi-part connecting ring, the parts of which are installed in the radial direction toward the piston rod and are operatively connected to it. The protective tube is connected to the connecting ring parts so that these parts come together to form a connecting ring which is braced at least in the radial direction.

10 Claims, 2 Drawing Sheets

PROTECTIVE TUBE FOR A PISTON-CYLINDER ASSEMBLY

BACKGROUND OF THE INVENTION

1. Field of the Invention

The invention pertains to a protective tube for a piston-cylinder assembly having a piston which is free to move in a cylinder, and a retaining element for the protective tube attached to the piston rod.

2. Description of the Related Art

The protective tube on a piston-cylinder assembly has the job of protecting the piston rod from external influences such as dirt and moisture, and in the case of a shock absorber it also has the task of protecting the assembly from impacts by stones, etc. Because of their location on the vehicle, shock absorbers in particular are subjected to especially severe loads. To achieve long-lasting protection for the piston rod, the protective tube is made of metal and is attached to the piston rod either indirectly by screws or directly by welds. For an example, see FIG. 7.6/47a in Fahrwerktechnik [Chassis Engineering], Jörnsen Reimpel, Vol. 3, 1974 edition, p. 42. The metal protective tube is coated to protect it against rust, but it is not always possible to prevent certain areas of the coating from separating from the inside walls of the protective tube during welding. It is very difficult to detect these areas even by a thorough final inspection, and they can be repaired only by a disproportionate amount of work. Precisely in the case of shock absorbers for passenger vehicles, protective tubes of plastic have become widely accepted, since it is known that they cannot rust. In the case of passenger vehicles, the thermal stress on the shock absorbers is usually not as great as in the case of trucks, so that the thermal load limit of a plastic protective tube is not reached when used in this situation. Plastic protective tubes have been known for a long time. As examples, reference can be made to DE 1,951,753 A1, DE 1,951,754 A1, and DE 1,995,281 A1. Plastic tubes, however, suffer in some cases from the disadvantage that it is very difficult to prevent them from assuming a skewed position with respect to the piston rod. In the case of trucks, it must also be anticipated that, on difficult terrain, obstacles will occur which can directly affect the protective tube and cause it is to become skewed.

SUMMARY OF THE INVENTION

The task of the present invention is to realize a protective tube for a piston-cylinder assembly which can be manufactured at reasonable cost but which also offers satisfactory protection against corrosion and remains correctly installed for a long time.

In accordance with the invention, the retaining element has a multi-part connecting ring, the parts of which are installed radially toward the piston rod and are in operative connection with it, where the protective tube and the connecting ring parts are connected to each other in such a way that these parts come together to form a connecting ring braced at least in the radial direction.

Regardless of the material of which the protective tube is made, an assembly sequence is possible in which the protective tube is installed after the piston-cylinder assembly has been coated. Precisely in the case of protective tubes made of metal, this possibility offers rather significant advantages, because the protective tube can be a completely finished component.

In another advantageous design, the retaining element has a central support disk, which is connected to the piston rod, the connecting ring acting in the radial direction on the support disk. The support disk can be used as part of an assembly for a bumper. Because the support disk is separate from the protective tube, no forces are introduced into the protective tube when a bumper is used.

For the secure positioning of the protective tube all the way around, the connecting ring has a radial clamping surface and an axial cover surface for the protective tube. The cover surface takes care of the positioning function, but it also serves the function of closing off the end of the protective tube. The end surface of the protective tube therefore does not need to be coated, because the cover surface of the connecting ring also has a sealing effect.

In an advantageous design variant, the clamping and cover surfaces are part of a groove inside the connecting ring, this groove being oriented in the axial direction of the protective tube.

In another design variant, the parts of the connecting ring have means for connecting the ring to the support disk. The need for an assembly device for assembling the connecting ring parts is therefore eliminated, because these parts can be attached individually to the support disk.

For this purpose, the connecting means consist of a profile, which engages with the support disk. The profile can enter into a positive, form-locking connection or into a friction-locking connection with the support disk. For example, the profile can consist of a circumferential groove, into which the support disk fits.

As an alternative, the support disk can have a circumferential rim which extends at least around certain sections of the circumference, to which the connecting ring can be attached. For example, pin-like projections on the connecting ring can engage with the rim of the support disk.

According to one embodiment, the parts of the connecting ring are connected to each other by locking means. This measure greatly simplifies the installation of the protective tube, because it prevents the connecting ring parts from shifting or sliding during the installation of the protective tube.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
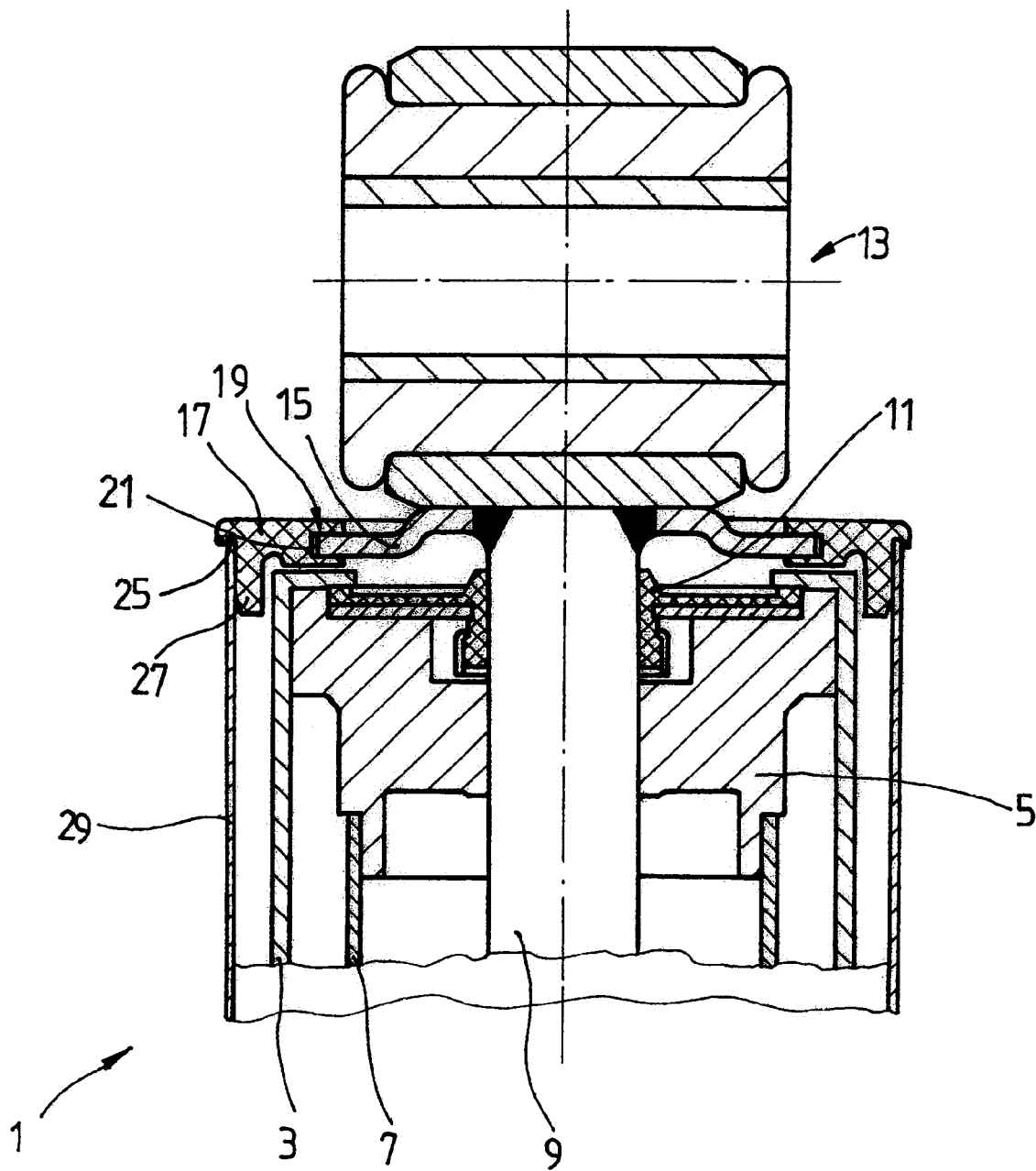
FIG. 1 shows a piston-cylinder assembly with a protective tube at the end where the piston rod exits.

FIG. 1 shows the piston rod-exit end of a piston-cylinder assembly 1. The assembly has a cylinder 3, which is sealed off at the end by a piston rod guide 5. Coaxial to the cylinder 3 is a pressure tube 7, in which the piston rod 9 is supported with freedom of axial movement. A piston rod seal 11 ensures that no working medium can escape from the piston-cylinder assembly. The above-cited components, namely, the pressure tube 7, the piston rod guide 5, and the piston rod seal 11, are braced across the flanged end of the cylinder 3.

Figure 2:
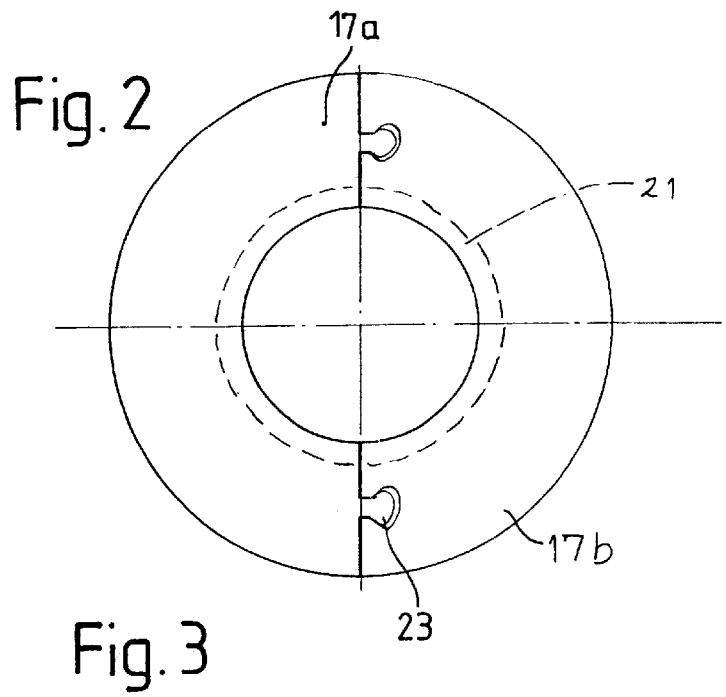
FIG. 2 is a plan view of a connecting ring as an individual part.

A connecting element 13, known per se, is attached to the outside end of the piston rod 9; in the present example, it is welded on. Underneath the connecting element there to is a support disk 15, which is also connected to the piston rod by welds. A multi-part connecting ring 17 is attached to the outer rim of the support disk 15. As can be seen in FIG. 2, the connecting ring 17 consists of two connecting ring parts 17a, 17b, which can be pushed radially onto the rim of the support disk 15. For this purpose, the connecting ring 17 has connecting means 19 in the form of a circumferential groove 21, into which the support disk fits. The connecting ring can be made of metal or plastic. So that the parts of the connecting ring 17 can be held together to form the connecting ring before the protective tube is installed, locking pins 23 providing a snap together connection are used, as can be seen in FIG. 2, although a friction-fit connection can also be used.

So that the connecting ring 17 can be positioned correctly and secured in place, the connecting ring 17 has a cover surface 25 and a clamping surface 27. The connecting ring has a circumferential web a short distance away from its outer rim, the outside wall of this web representing the clamping surface 27. The web also supplies the cover surface 25 for the end of the protective tube 29, which can consist of plastic or of metal. The support disk 15 and the connecting ring 17 or connecting ring parts 17a; 17b form the retaining element for the protective tube, holding it permanently in position with respect to the piston rod 9. After the protective tube 29 has been pushed onto the web of the connecting ring, the circumferential groove 21 and the enclosing protective tube 29 make it impossible for the connecting ring 17 to move in the axial or radial direction, the ring thus being held securely in place. As can be derived from FIG. 1, the part of the connecting ring 17 which supports the protective tube 29 is outside the area which can come into contact with the edge of the cylinder 3 when the piston rod 9 moves inward as far as it can. For this reason, the support disk 15 can cooperate with a bumper (not shown) on the end surface of the piston rod guide 5 without subjecting the connecting ring 17 to excessive load. Instead, the support disk 15 acts as protective armor for the connecting ring 17.

Figure 3:
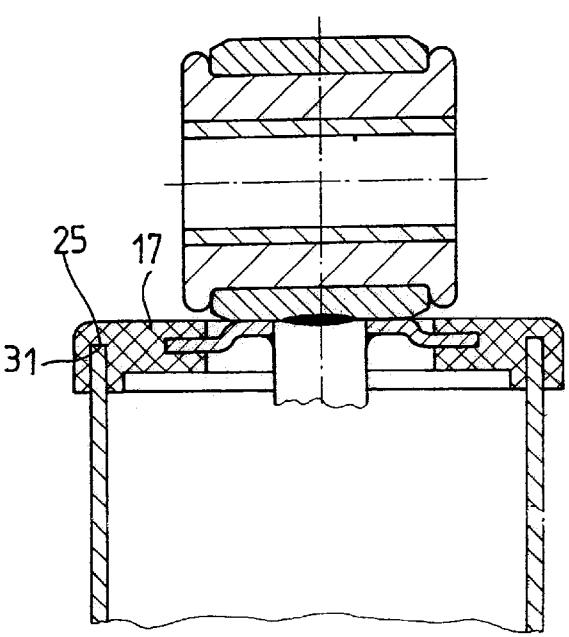
FIG. 3 is a section view showing a connecting ring having a groove for receiving the protective tube.
Figure 4:
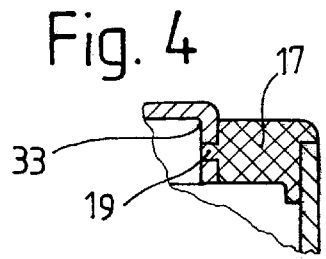
FIG. 4 is a partial section view showing a support disk having an axially extending rim.

FIGS. 3 and 4 illustrate additional embodiments of the connecting ring. In contrast to FIG. 1, FIG. 3 shows a connecting ring 17 design with a circumferential edge in which a circumferential groove 31 is provided, into which the protective tube 29 is pushed. The base of the groove and the sidewalls of the groove form the cover surface 25 and clamping surface 27. In this variant, the end of the protective tube is especially well protected.

FIG. 4 shows a support disk 15 having a rim 33, which extends axially at least along certain sections of the disk to give the disk additional rigidity. The rim 13 has radial openings into which radially-oriented pins 19 on the connecting ring 17 fit to serve as connecting means.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in: connection with any disclosed form or embodiment of the invention may be incorporated in any. other disclosed or described or suggested form or embodiment as a general matter of design choice. It is the intention, therefore, to be limited only as indicated by the scope of the claims appended hereto.

We claim:

1. A piston cylinder assembly comprising
a cylinder having an axis,
a piston rod which is free to move axially in said cylinder and has a section extending outside the cylinder,
a protective tube which is coaxial to said piston rod and said cylinder, and
a retaining element which fixes said protective tube to said piston rod, said retaining element comprising a multi-part connecting ring comprising connecting parts which are fitted radially toward said piston rod and lie in a common plane which is orthogonal to the cylinder axis, said connecting ring being braced at least in the radial direction by the protective tube.

2. The piston cylinder assembly according to claim 1 wherein said retaining element further comprises a central support disk which is fixed to the piston rod, said connecting parts being fitted radially to said support disk.

3. The piston cylinder assembly of claim 1 wherein the connecting ring has a radial clamping surface and an axial cover surface for said protective tube.

4. The piston cylinder assembly of claim 1 wherein the connecting ring comprises an axially facing annular groove which receives an end of the tube, said groove comprising said radial clamping surface and said cover surface.

5. The piston and cylinder assembly of claim 2 wherein said connecting ring comprises connecting means for connecting said connecting ring to said support disk.

6. The piston and cylinder assembly of claim 5 wherein said connecting means comprise a profile which engages the support disk.

7. The piston and cylinder assembly of claim 6 wherein said profile comprises a radially facing groove which engages said support disk.

8. The piston and cylinder assembly of claim 2 wherein said support disk has a circumferential rim which engages said connecting ring.

9. The piston and cylinder assembly of claim 1 wherein said connecting parts comprise locking means for locking said parts together to form said connecting ring around said piston rod.

10. A protective assembly for a piston cylinder assembly comprising a cylinder having an axis and a piston rod which is free to move axially in said cylinder and has a section extending outside said cylinder, said protective assembly comprising
a protective tube, and
a retaining element for fixing said protective tube to said piston rod coaxially with said cylinder, said-retaining element comprising a multi-part connecting ring comprising connecting parts which are fitted radially toward said piston rod and lie in a common plane which is orthogonal to the cylinder axis, said connecting ring being braced in the radial direction by the protective tube.

* * * * *